United States Patent Office 3,498,840
Patented Mar. 3, 1970

3,498,840
SEPARATOR FOR ALKALINE BATTERIES AND METHOD OF MAKING SAME
Howard Eugene Hoyt and Helmuth Louis Pfluger, Huntingdon Valley, Pa., assignors to Borden, Inc., a corporation of New Jersey
No Drawing. Filed Nov. 2, 1967, Ser. No. 679,980
Int. Cl. H01m 3/02; C08f 15/18
U.S. Cl. 136—6
10 Claims

ABSTRACT OF THE DISCLOSURE

This invention relates to the preparation of membranes suitable for use as separators in concentrated alkaline battery cells by selective solvolysis of copolymers of methacrylate esters with acrylate esters followed by addition of a base and to the resultant products.

ORIGIN OF THE INVENTION

The invention described herein was made in the performance of work under a NASA contract and is subject to the provision of Section 305 of the National Aeronautics and Space Act of 1958, Public Law 85–568 (72 STAT. 435; 42 USC 2457).

BACKGROUND OF THE INVENTION

The cycle life of rechargeable battery cells is limited by the tendency of the electrodes to short circuit and it is known that this tendency can be slowed down by the use of a separator membrane between the electrodes. Such a separator must have low resistance to the passage of an electrolytic current and in many applications it must also be stable against oxidation. This is particularly the case with alkaline silver-zinc or silver-cadmium cells, the silver oxide in such cells being a powerful oxidizing agent. For this reason, separators heretofore used have not proven satisfactory since cells of only a very limited cycling life can be obtained.

Attempts to use membranes of polyacrylic acid which is known to be extremely resistant to oxidation and whose inherent polarity makes it compatible with concentrated alkali and which is receptive, in association with said alkali, to the passage of an electrolytic current have not been successful since polyacrylic acid as a membrane is soluble in alkali. One effective way of exploiting the advantageous inherent properties of polyacrylic acid is to incorporate it into a film with an insolubilizing polymer such as methyl cellulose. While such formulations do possess a high degree of resistance to oxidation, the methyl cellulose combination is not as oxidation-resistant as polyacrylic acid by itself.

SUMMARY OF THE INVENTION

It has now been found that certain copolymers of methacrylate esters with acrylic acid form membranes that possess the required combination of properties, namely, extreme oxidation resistance, insolubility in concentrated aqueous alkali, and high conductivity of an electrolytic current when in equilibrium with battery alkali.

The instant invention comprises the method of making these copolymers by first copolymerizing a methacrylate ester (or esters) with a more readily hydrolyzable ester, followed by a selective saponification whereby the methacrylate ester moieties remain essentially intact and the readily hydrolyzable ester moiety is saponified and to the partial or complete neutralization of the relatively brittle copolymer acid with a base to make membranes which are sufficiently flexible in the dry state so that they may be wrapped around electrodes without damage by handling.

The invention also comprises the resultant membranes and to electrochemical cells utilizing said membranes.

DETAILED DESCRIPTION

In carrying out the method of this invention, the copolymer is prepared by copolymerizing a methacrylate ester and a more easily-hydrolyzable monomer copolymerizable therewith selected from the group consisting of esters of $C_1$–$C_8$ alkyl alcohols with an alpha-beta unsaturated acid. The proportion of copolymerizable easily hydrolyzable monomer may be 10 to 60 mole-percent of the total ester monomers, and preferably 15 to 50 mole-percent, in the copolymer.

As to materials, the methacrylate ester used may be the reaction product of any $C_1$ to $C_8$ alkyl alcohol, preferably $C_1$ to $C_4$, with methacrylic acid. Example of suitable alcohols are methanol, ethanol, propanol, and butanol.

The copolymerizable monomer is preferably again the reaction product of a $C_1$ to $C_4$ alkyl alcohol with acrylic acid although other alpha-beta unsaturated acids such as itaconic, maleic, or fumaric can be used.

The copolymer prepared is then subjected to saponification conditions, i.e., treated with an excess of alkali (such as ammonium hydroxide, sodium hydroxide, and the like) at 100 C. or less. Under such conditions only the easily hydrolyzable ester is substantially saponified and the hydrolyzed polymer thus contains the following units randomly distributed throughout the copolymer within the molar ratios noted:

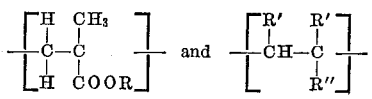

wherein R is $C_1$–$C_8$ alkyl group, R' is hydrogen or carboxylate ion, and R" is hydrogen, carboxylate, or carboxylate, or carboxylate methyl ion. It is understood that the cation portion of the saponifying alkali is a counter ion to the negative carboxylate or carboxylate methyl ion.

By this means it has been found possible to produce polymers containing a much higher proportionality of carboxyl groups than it is possible to obtain by direct copolymerization of methacrylate ester with acrylic acid, it being well known in the art of copolymerization of olefinic monomers that great difficulty is encountered in the incorporation of substantially molar proportions of acrylic or substituted acrylic acids with acrylate or methacrylate esters.

One advantage of this procedure is that a controllable range of polarity can be accomplished by synthetic means as opposed to the use of materials of the prior art which have a fixed polarity range. Thus, it appears possible to control the ratio of the acid moiety in the copolymer to correspond to optimum electrolytic conduction of any concentration of alkali, from 20% to 50%, potassium hydroxide for example.

Following saponification of the methacrylate-acrylate copolymers the hydrolyzed product may be recovered in acid form. For this purpose the saponification product is added to aqueous mineral acid with stirring. We have found that the acid form of the hydrolyzed copolymers is much less soluble in water than the alkaline form. Precipitation occurs and the acid form of copolymer can be readily recovered by filtration and washing.

For purposes of laying down the films of this invention it is preferred to neutralize or partially neutralize the acid form by the addition of a suitable base. It has been surprisingly found that the relatively brittle copolymer acid is converted by this neutralization to a material sufficiently flexible in the dry state that it may be wrapped with ease around electrodes without damage by handling. The base used for the said neutralization may include potassium hydroxide, sodium hydroxide, tetramethylammonium hydroxide, ammonia, substituted amines such as methylamine, ethylamine, dimethyl amine, propylamine, ethanolamine, triethanolamine, propylamine, aniline, pyridine and quinoline. Preferred bases are hydroxy propylamine and triethanolamine.

The aqueous solution may be cast in sheet form and evaporated to dryness. Other forms may be made as for example plates, slabs, "buttons," films and the like. Solutions should not be so concentrated as to precipitate the components before drying.

Good flexibility in the film is of particular importance in the construction of the individual battery cells during the operation of wrapping the separators around the electrodes. In one common technique a so-called U wrap is made whereby two positive electrodes are placed butt end to butt end on a sheet of separator and after, for example, six wraps of the pair the wrapped assembly is folded at the junction in the form of the letter U. When separators of poorer flexibility are used cracks tend to occur in the separator at the base of the U, particularly in the outer wraps, thus destroying the utility of the separator at these points. We have found experimentally that this is particularly likely to occur below a certain critical threshold of flexibility, corresponding to withstanding at least about 800 flex cycles as measured by the ASTM Folding Endurance Test D643–43 with 200 grams tension on the specimen.

The invention will be further described in connection with the following examples which are set forth for the purpose of illustration only and wherein proportions are in parts by weight unless specifically stated to the contrary.

EXAMPLE 1

To a one liter resin flask equipped with stirrer, reflux condenser, heater, addition appurtenances and nitrogen purge the following were charged:

Benzene (distilled over sodium) _____ml__ 500
Methyl methacrylate _____grams__ 100 (1 mol)
Ethyl acrylate _____do____ 100 (1 mol)
Azobisisobutyronitrile _____gram__ 0.2

After purging with nitrogen the benzene was brought to reflux. After 2 hours 25 ml. benzene containing 0.2 grams azobisisobutylronitrile was added and the reaction held at 75° C. for a total of 19 hours. At the end of this time a solids determination showed 29.6% of nonvolatiles which corresponded to a conversion to polymer of about 94%.

The reaction mixture was cast as a thin film on a large foil tray in the fume hood. This was removed from the foil and vacuum dried to constant weight at 50° C. for 6 hours.

By saponification a sample consumed standard alkali corresponding to 4.22 ml. N/1 per gram of polymer. This corresponded to 42.2 mol percent of the ester groups present.

EXAMPLE 2

64 grams of the coploymer ester of Example 1 were saponified by heating on a steam bath with 2500 ml. isopropanel, 925 ml. water and 52 grams of 30% KOH for 18 hours. The isopropanol was then distilled off and the resulting aqueous solution was added slowly to 200 ml. of water containing 10 ml. concentrated sulfuric acid. A white fibrous solid precipitated out. This was filtered off and washed repeatedly with cold water.

The white solid was first air-dried, then vacuum dried for several hours at 154° F. to constant weight. The yield of dry product was 47.2 grams. This represented a conversion, of copolymer ester to partially hydrolyzed ester, of 83.7% based on the prognosticated degree of hydrolysis of the analytical saponification of Example 1.

A sample of the acidic polymer was dissolved in aqueous methanol and titrated with 5 N NaOH. This gave a value of 4.8 ml. N/1 per gram of polymer and corresponded to 42.3 mol percent hydrolysis of the copolymer ester to free acid groups.

Analysis of the product for carbon and hydrogen:

| Element | Wt. percent | Equiv. to combined acrylic acid, mol percent |
|---|---|---|
| C | 55.6 | 44.0 |
| H | 7.25 | 30.8 |
| O [1] | 37.15 | 42.3 |

[1] By difference.

EXAMPLE 3

One gram of the acidic polymer of Example 2 was dissolved in 9 ml. water by solubilizing with 1 ml. of reagent ammonia. A film was cast from this solution using a doctor blade on a levelled glass plate. Upon drying a thin film formed on the glass which was too brittle to remove, shattering into small pieces when scraped. It is believed that the dried film was of substantially the same composition as the original acid polymer of Example 2, having reverted by evaporation of ammonia to the precursor acid polymer.

EXAMPLE 4

One gram of the acidic polymer of Example 2 was dissolved in 4 ml. water by solubilizing with 0.45 gram 3-hydroxypropylamine, an amount stoichiometrically equivalent to the acid groups present. The solution was cast at 22 mils clearance as in Example 3. The dried film measured 1.5 mils in thickness. It was very flexible and slightly tacky, showing a tendency to stick to itself when pressure was applied. It was insoluble in 45% KOH and in this medium showed a specific resistance of 7.2 ohms-cm. of swollen thickness. This low electrolytic resistance was somewhat below that of an unplasticized cellophane film (PUDO 119) such as is currently used for batteries, the comparison value for the latter being 9.8 ohms-cm. of swollen thickness.

EXAMPLE 5

Ten grams of the acid polymer of Example 2 was dissolved in 130 ml. water solubilized with 2.25 grams 3-hydroxypropylamine, an amount stoichiometrically equivalent to half the acid groups of the polymer, plus 10 ml. reagent ammonia, an excess over the total acid groups present. The solution was cast at 30 mils clearance on the doctor blade to give a dried film of 1.6 mils thickness. This film was of a flexibility and softness intermediate between that of Examples 3 and 4, being neither sticky nor brittle. It gave a flex test of 2368 cycles before breaking (MIT Flex Test ASTM D643–43). The tensile strength of the film was 2390 p.s.i. and the percent elongation at break 189%. The specific resistance of the film was 26 ohms-cm. in 45% KOH.

EXAMPLE 6

Two grams of the acid polymer of Example 2 were dissolved in 27 ml. water by solubilizing with 1.45 ml. 30% KOH. This amount of KOH corresponded to a stoichiometric equivalent of the acid function. The 1.4 mil film cast from this solution was hard and flexible, giving an average of 12,566 cycles in the ASTM fold test. Tensile strength was 2340 p.s.i. Resistance in 45% KOH was 35.7 ohms-cm.

EXAMPLE 7

Two grams of the acid polymer of Example 2 were dissolved in 27 ml. water by solubilizing with .74 gram triethanolamine (0.5 equivalent) and 1.7 ml. reagent ammonia. The 1.7 mil film prepared by casting this solution was hard and flexible (5741 cycles in the ASTM fold test). Resistance in 45% KOH was 35.7 ohms-cm.

The cells in which the membrane can be used are the silver-zinc, silver-cadmium, or other like alkaline cells.

It will be understood that it is intended to cover all changes and modifications of the examples of the invention herein chosen for the purpose of illustration which do not constitute departures from the spirit and scope of the invention.

What is claimed is:

1. The method of making an oxidation resistant, highly conductive battery separator membrane comprising the steps of copolymerizing (a) a $C_1$–$C_8$ alkyl ester of methacrylic acid and (b) a readily hydrolyzable $C_1$–$C_8$ alkyl ester of an alpha-beta unsaturated acid which ester is more readily hydrolyzable than said methacrylic ester, selectively saponifying said copolymer so as to substantially saponify all of said readily hydrolyzable moity in the copolymer without any substantial saponification of said methacrylic acid moiety, and forming the thus saponified polymer into a membrane.

2. The method of claim 1 wherein ester (a) is methyl methacrylate, ester (b) is ethyl acrylate and the copolymer contains from about 10 to about 60 mol-percent of ethyl acrylate.

3. The method of claim 1 wherein the saponified copolymer is converted to the acid form by contact with an acid prior to formation of the membrane.

4. The method of claim 3 wherein the acid form of the copolymer is at least partially neutralized by a base prior to formation of the membrane.

5. A battery separator for alkaline electrochemical cells comprising the membrane made according to the process of claim 1.

6. A battery separator for alkaline electrochemical cells comprising the membrane made according to the process of claim 3.

7. A battery separator for alkaline electrochemical cells comprising the membrane made according to the process of claim 4.

8. An alkaline electrochemical cell comprising electrodes, a concentrated aqueous alkali fluid, and the battery separator of claim 5 interposed between the electrodes.

9. An alkaline silver cell comprising electrodes, a concentrated aqueous alkali fluid, and the battery separator of claim 6 interposed between the electrodes.

10. An alkaline silver-zinc cell comprising a silver electrode, a zinc electrode, a concentrated aqueous alkali fluid, and the battery separator of claim 7 interposed between the electrodes.

References Cited

UNITED STATES PATENTS

| | | | |
|---|---|---|---|
| 3,284,382 | 11/1966 | Rosser et al. | 136—146 XR |
| 3,330,702 | 7/1967 | Horowitz | 136—146 |
| 3,376,168 | 4/1968 | Horowitz | 136—146 |

WINSTON A. DOUGLAS, Primary Examiner

L. L. WALTON, Assistant Examiner

U.S. Cl. X.R.

136—146, 148; 260—86.1E